US009319128B2

(12) United States Patent
Yamamoto et al.

(10) Patent No.: US 9,319,128 B2
(45) Date of Patent: Apr. 19, 2016

(54) HELICOPTER SATELLITE COMMUNICATION SYSTEM, HELICOPTER-MOUNTED COMMUNICATION APPARATUS, TERRESTRIAL STATION COMMUNICATION APPARATUS, COMMUNICATION METHOD, AND NON-TRANSITORY COMPUTER-READABLE RECORDING MEDIUM STORING COMPUTER PROGRAM

(71) Applicants: Kazushi Yamamoto, Tokyo (JP); Yutaka Ozaki, Tokyo (JP); Hayato Okuda, Tokyo (JP)

(72) Inventors: Kazushi Yamamoto, Tokyo (JP); Yutaka Ozaki, Tokyo (JP); Hayato Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 46 days.

(21) Appl. No.: 14/388,670

(22) PCT Filed: Mar. 18, 2013

(86) PCT No.: PCT/JP2013/057667
§ 371 (c)(1),
(2) Date: Sep. 26, 2014

(87) PCT Pub. No.: WO2013/146423
PCT Pub. Date: Oct. 3, 2013

(65) Prior Publication Data
US 2015/0055549 A1 Feb. 26, 2015

(30) Foreign Application Priority Data
Mar. 29, 2012 (JP) ................................. 2012-077558

(51) Int. Cl.
*H04B 7/185* (2006.01)
*H04N 19/146* (2014.01)

(52) U.S. Cl.
CPC ........ *H04B 7/18508* (2013.01); *H04B 7/18543* (2013.01); *H04N 19/146* (2014.11)

(58) Field of Classification Search
None
See application file for complete search history.

(56) References Cited

U.S. PATENT DOCUMENTS 6,747,983 B1 6/2004 Knutson et al.
6,845,107 B1 * 1/2005 Kitazawa ........... H04N 21/2365
348/387.1

(Continued)

FOREIGN PATENT DOCUMENTS

JP 2000 188614 7/2000
JP 2002 330092 11/2002

(Continued)

OTHER PUBLICATIONS

International Search Report Issued May 14, 2013 in PCT/JP13/057667 Filed Mar. 18, 2013.

(Continued)

*Primary Examiner* — Hong Cho
(74) *Attorney, Agent, or Firm* — Oblon, McClelland, Maier & Neustadt, L.L.P.

(57) ABSTRACT

A helicopter-mounted communication apparatus encodes video data at a compression rate based on a percentage of time a transmission beam is blocked by rotor blades. When a number of video packets is less than a specified number, the helicopter-mounted communication apparatus inserts null packets to keep a packet rate constant, then deletes the null packets and attaches additional information to another packet indicating the number of deleted null packets, and after buffering modulates and transmits a signal toward a communication satellite at transmittable-time points. A terrestrial station communication apparatus receives and demodulates the transmitted signal via the communication satellite, generating a packet stream, and based on the additional information included in the generated packet stream, inserts null packets in the packet stream and buffers the packet stream, thereby keeping the packet rate constant, and then separates the video packets from the packet stream and decodes the separated video packets.

9 Claims, 11 Drawing Sheets

(56) References Cited

U.S. PATENT DOCUMENTS

| | | | |
|---|---|---|---|
| 9,167,211 B2 * | 10/2015 | Hong | H04N 7/17318 |
| 2010/0158138 A1 * | 6/2010 | Ryu | H04B 7/18513 375/259 |

FOREIGN PATENT DOCUMENTS

| | | |
|---|---|---|
| JP | 2006-282039 A | 10/2006 |
| JP | 2009 44354 | 2/2009 |
| JP | 2009 147855 | 7/2009 |
| JP | 2009-171514 A | 7/2009 |
| JP | 2009 212665 | 9/2009 |
| JP | 2011 83040 | 4/2011 |

OTHER PUBLICATIONS

Office Action issued Jul. 15, 2015 in Korean Patent Application No. 10-2014-7026690 (with English language translation).

* cited by examiner

FIG. 3A

VIDEO-ENCODING-PARAMETER-SETTING TABLE 211T

| BLOCKED-TIME RATE TR | VIDEO-ENCODING RATE | IMAGE-FRAMING RATE |
|---|---|---|
| LESS THAN 20% | HIGH SPEED | HIGH SPEED |
| 20% OR GREATER AND LESS THAN 40% | INTERMEDIATE SPEED | HIGH SPEED |
| 40% OR GREATER AND LESS THAN 60% | INTERMEDIATE SPEED | INTERMEDIATE SPEED |
| 60% OR GREATER AND LESS THAN 80% | LOW SPEED | INTERMEDIATE SPEED |
| 80% OR GREATER | LOW SPEED | LOW SPEED |

FIG. 3B

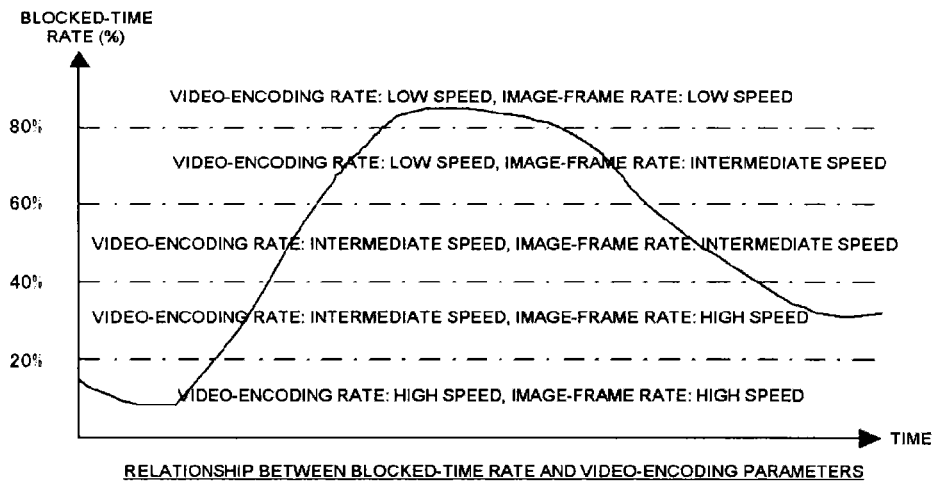

RELATIONSHIP BETWEEN BLOCKED-TIME RATE AND VIDEO-ENCODING PARAMETERS

SELECTION-CONTROL TABLE 203T

| BLOCKED-TIME RATE TR | NULL-PACKET-SELECTION RATE (PER NUMBER OF PACKETS) |
|---|---|
| LESS THAN 20% | 0 |
| 20% OR GREATER AND LESS THAN 40% | 20% |
| 40% OR GREATER AND LESS THAN 60% | 40% |
| 60% OR GREATER AND LESS THAN 80% | 55% |
| 80% OR GREATER | 70% |

HELICOPTER SATELLITE COMMUNICATION SYSTEM, HELICOPTER-MOUNTED COMMUNICATION APPARATUS, TERRESTRIAL STATION COMMUNICATION APPARATUS, COMMUNICATION METHOD, AND NON-TRANSITORY COMPUTER-READABLE RECORDING MEDIUM STORING COMPUTER PROGRAM

TECHNICAL FIELD

The present disclosure relates to a helicopter satellite communication system, helicopter-mounted communication apparatus, terrestrial station communication apparatus, communication method, and computer program.

BACKGROUND ART

When performing communication between a helicopter and a terrestrial station via a communication satellite, the rotor blades of the helicopter intermittently block (instantaneously interrupt) the signal that is transmitted from the helicopter. Therefore, communication by a helicopter-mounted communication apparatus has lower efficiency than that in normal communication.

In order to deal with this kind of problem, a helicopter-mounted communication apparatus that is disclosed in Patent Literature 1 detects the rotation angle of the rotor blades, and then based on the detected rotation angle, changes the data compression and encoding parameters depending on the timing when the rotor blades cross the emission range of the antenna and the amount of accumulated transmission data, and stops transmission during the period that the rotor blades cross the emission range. As a result, the helicopter-mounted communication apparatus prevents a situation in which the rotor blades hinder communication.

CITATION LIST

Patent Literature

Patent Literature 1: Unexamined Japanese Patent Application Kokai Publication No. 2011-083040

SUMMARY OF INVENTION

Technical Problem

Depending on the orientation or geographical position of the helicopter, the direction of the communication satellite as seen from the antenna differs. Therefore, the percentage of the time that a beam transmitted from the antenna is blocked (instantaneously interrupted) by the rotor blades changes. In other words, presuming that the rotor blades are rotating at a constant cycle, and the width of the rotor blades is fixed, the percentage of time that the transmission beam that is transmitted toward the communication satellite is blocked (instantaneously interrupted) by the rotor blades during one cycle of the rotor blades becomes smaller the further the direction of the transmission beam toward the communication satellite is separated from the base of the rotor blades.

Patent Literature 1 also discloses a processing method for processing transmission data based on this kind of condition in which the percentage of time that the beam is blocked by the rotor blades changes; however, when the percentage of time of blockage is large, fluctuation occurs in the transmission rate, and this fluctuation can cause degradation of the video quality, such as image disorder or a stopped video. In order to suppress this fluctuation of the transmission rate, it is necessary to lower the upper limit of the percentage of time of blockage, and in that case, there are restrictions in the flight conditions of the helicopter.

In order to solve the problem described above, the objective of the present disclosure is to provide helicopter satellite communication that is capable of transmitting video with consistent quality while at the same time suppressing fluctuation of the transmission rate.

Moreover, another object of the present disclosure is to provide helicopter satellite communication that is capable of transmitting high-quality video.

Solution to Problem

The helicopter satellite communication system of the present disclosure is a helicopter satellite communication system that performs communication between a helicopter-mounted communication apparatus and a terrestrial station communication apparatus via a communication satellite, wherein the helicopter-mounted communication apparatus includes: a blocked-time-rate estimator that estimates a blocked-time rate, which is the percentage of the time that a transmission beam that is transmitted from the helicopter-mounted communication apparatus toward the communication satellite is blocked by rotor blades; a video-encoding-parameter selector that selects video-encoding parameters based on the blocked-time rate that is estimated by the blocked-time-rate estimator; a video encoder that encodes video data according to the video-encoding parameters selected by the video-encoding-parameter selector, and outputs video packets; a data selector that, when the number of video packets that are output from the video encoder is less than a specified number, inserts null packets to keep the transmission packet rate substantially constant; a null-packet deleter that deletes null packets in a packet stream that is output from the data selector and attaches information indicating the number of the deleted null packets to another packet; a buffer that buffers packets after deleting of null packets by the null-packet deleter; and a modulator/transmitter that modulates packets that are stored in the buffer and transmits those packets toward the communication satellite during a transmittable period; and the terrestrial station communication apparatus includes: a receiver that receives a signal that is transmitted from the helicopter-mounted communication apparatus via the communication satellite; a demodulator that demodulates the signal received by the receiver and generates a packet stream; a null-packet inserter that, based on attached information that is included in the packet stream that is reproduced by the demodulator, inserts null packets into the packet stream and deletes the attached information; a rate-fluctuation compensator that keeps the packet rate substantially constant by buffering a packet stream after inserting of null packets by the null-packet inserter; a data separator that separates video packets from the packet stream that is output from the rate-fluctuation compensator; and a video decoder that decodes the video packets that are separated out by the data separator.

Advantageous Effects of Invention

With the present disclosure, the changing of the information speed by deleting or inserting null packets in a state of a substantially constant transmission rate regardless of the blocked-time rate, enables even higher quality video transmission in a helicopter satellite communication system.

BRIEF DESCRIPTION OF DRAWINGS

FIG. 3A is a drawing illustrating an example of a video-encoding-parameter-setting table that is stored in the video-encoding-parameter-selection circuit illustrated in FIG. 2;

FIG. 3B is a drawing illustrating the relationship between the video-encoding rate and video-frame rate that is obtained by applying the video-encoding parameters illustrated in FIG. 3A;

DESCRIPTION OF EMBODIMENTS

An embodiment of the present disclosure is explained hereafter with reference to the drawings.

(Embodiment)

Figure 1:
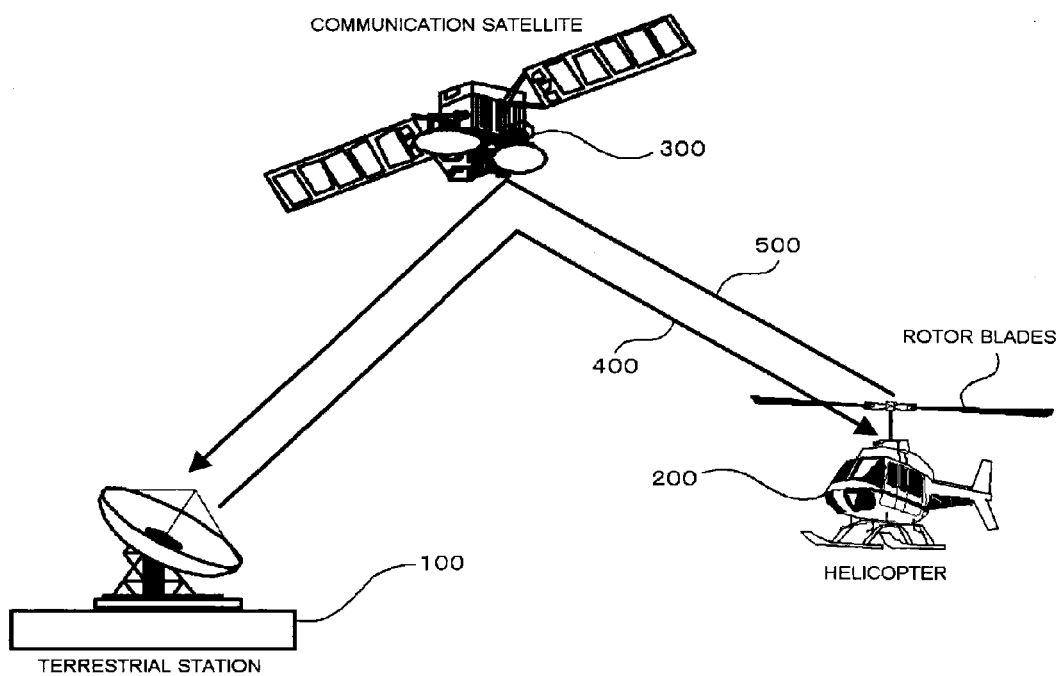
FIG. 1 is a drawing of the overall configuration of a helicopter satellite communication system of an embodiment of the present disclosure.

As illustrated in FIG. 1, the helicopter satellite communication system 1 of an embodiment of the present disclosure is a system for performing communication via a communication satellite 300 between a terrestrial station communication apparatus 100 that is located on the ground and a helicopter-mounted communication apparatus 200 that is located in a helicopter. The helicopter satellite communication system 1 includes: a transmission line 400 for transmission from the terrestrial station communication apparatus 100 to the helicopter-mounted communication apparatus 200 via the communication satellite 300; and a transmission line 500 for transmission from the helicopter-mounted communication apparatus 200 to the terrestrial station communication apparatus 100 via the communication satellite 300.

Rotor blades for giving lift and a propulsive force to the helicopter are located on the top section of the helicopter. The rotation of the rotor blades intermittently blocks (instantaneously interrupts) communication between the helicopter-mounted communication apparatus 200 and the communication satellite 300.

Figure 2:
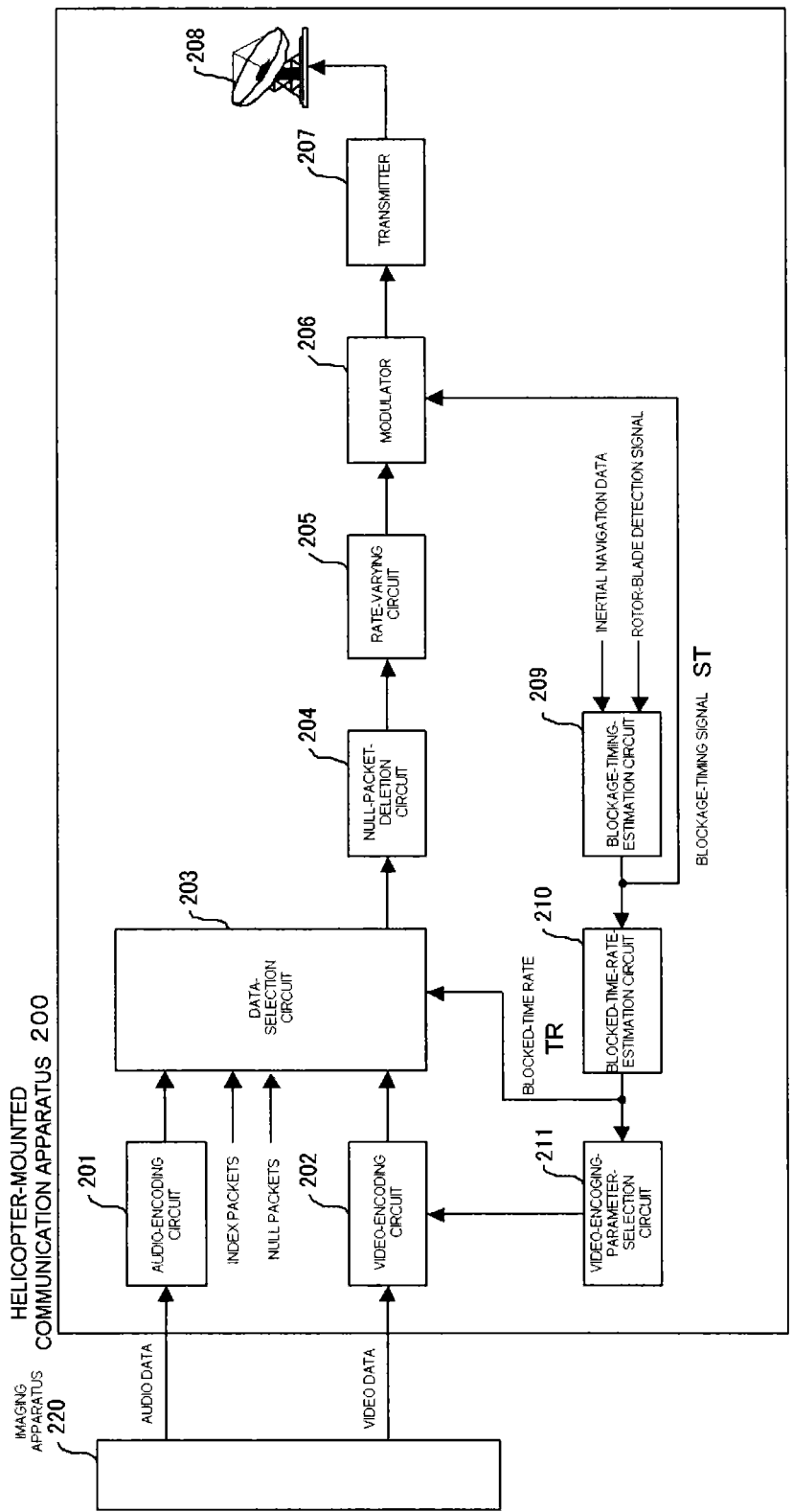
FIG. 2 is a block diagram illustrating the structure of a helicopter-mounted communication apparatus of an embodiment of the present disclosure.

As illustrated in FIG. 2, the helicopter-mounted communication apparatus 200 is connected to an imaging apparatus 220, and includes: an audio-encoding circuit 201, a video-encoding circuit 202, a data-selection circuit 203, a null-packet-deletion circuit 204, a rate-varying circuit 205, a modulator 206, a transmitter 207 and an antenna 208.

The helicopter-mounted communication apparatus 200 also further includes: a blockage-timing-estimation circuit 209, and blocked-time-rate-estimation circuit 210, and a video-encoding-parameter-selection circuit 211.

The imaging apparatus 220 is mounted on the helicopter together with the helicopter-mounted communication apparatus 200, and this imaging apparatus 220 performs image processing and outputs video data and audio data.

The audio-encoding circuit 201 compresses and encodes audio data that is output from the imaging apparatus 220.

The video-encoding circuit 202 functions as a video encoder that, according to video-encoding parameters selected by the video-encoding-parameter-selection circuit 211, compresses and encodes video data that is output by the imaging apparatus 220, and outputs video packets. As is described later, the video-encoding-parameter-selection circuit 211, in response to an increase in the blocked-time rate, selects video-encoding parameters so that the video-encoding rate and video-frame rate become low (so that the compression rate becomes high). Therefore, the video-encoding circuit 202, in response to an increase in the blocked-time rate, compresses and encodes video data so that the video-encoding rate and the video-frame rate become low (so that the compression rate becomes high). Consequently, the number of video packet that the video-encoding circuit 202 outputs decreases as the blocked-time rate increases, assuming that the amount of video data that is input is the same.

The data-selection circuit 203 functions as a data selector that sequentially selects and outputs audio packets that are output from the audio-encoding circuit 201, video packets that are supplied from the video-encoding circuit 202, and predetermined index packets. The data-selection circuit 203 also, in response to the blocked-time rate TR that is supplied from the blocked-time-rate-estimation circuit 210, selects and outputs null packets at a predetermined percentage with respect to the video packets, and generates a TS (Transport Stream) stream having a constant TS rate. In other words, the data-selection circuit 203 selects null packets when the video packets per unit time are less than a specified number (number of video packets that are supplied when the blocked-time rate TR is lowest).

Figures 4, 5:
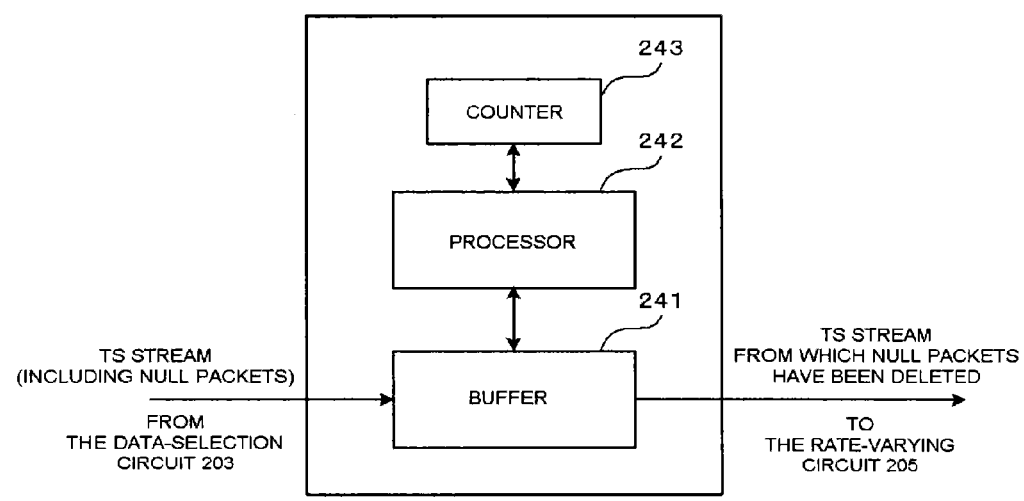
FIG. 4 is a drawing illustrating an example of a selection-control table that is stored in the data-selection circuit illustrated in FIG. 2.
FIG. 5 is a block diagram illustrating the structure of the null-packet-deletion circuit illustrated in FIG. 2.

For example, the data-selection circuit 203 stores a selection-control table 203T that correlates the blocked-time rate TR and null-packet-selection rate such as illustrated in the example in FIG. 4. This selection-control table 203T defines that as the blocked-time rate TR increases, the percentage for selecting null packets increases. For example, this selection-control table 203T is designed to select and output null packets for 0% of the number of input video packets when the blocked-time rate TR is 10%, 20% of the number of input video packets when the blocked-time rate TR is 30%, 55% of the number of input video packets when the blocked-time rate TR is 70%, and null packets for 70% of the number of input video packets when the blocked time rate is 90%. By selecting and outputting null packets in this way, that is, performing supplementation with null packets when the number of video packets is reduced and become less than the specified number as the blocked-time rate TR increases, the TS rate is kept substantially constant.

The null-packet-deletion circuit 204 functions as a null-packet deleter that deletes null packets that do not include any valid information (null packets that are added by the data selection circuit 203).

More specifically, as illustrated in FIG. 5, the null-packet-deletion circuit 204 includes: a buffer 241, a processor 242 and a counter 243.

Packets that are output from the data-selection circuit 203 are sequentially stored in the buffer 241. The processor 242 determines whether the packets stored in the buffer 241 are null packets. More specifically, as illustrated in FIG. 6A, each packet has a TS header and a payload, and the TS header is configured as illustrated in FIG. 6B.

The processor 242 checks the value of the PID (Packet ID) that is included in the TS header that is attached to the start of each packet, and when the value is 1FFFhex, the packet is determined to be a null packet, and when the value is other than 1FFFhex, the packet is not determined to be a null packet.

When it is determined that a packet is a null packet, the processor 242 discards the packet in the buffer 241, and increases the counter value of the counter 243 by +1.

Figure 6:
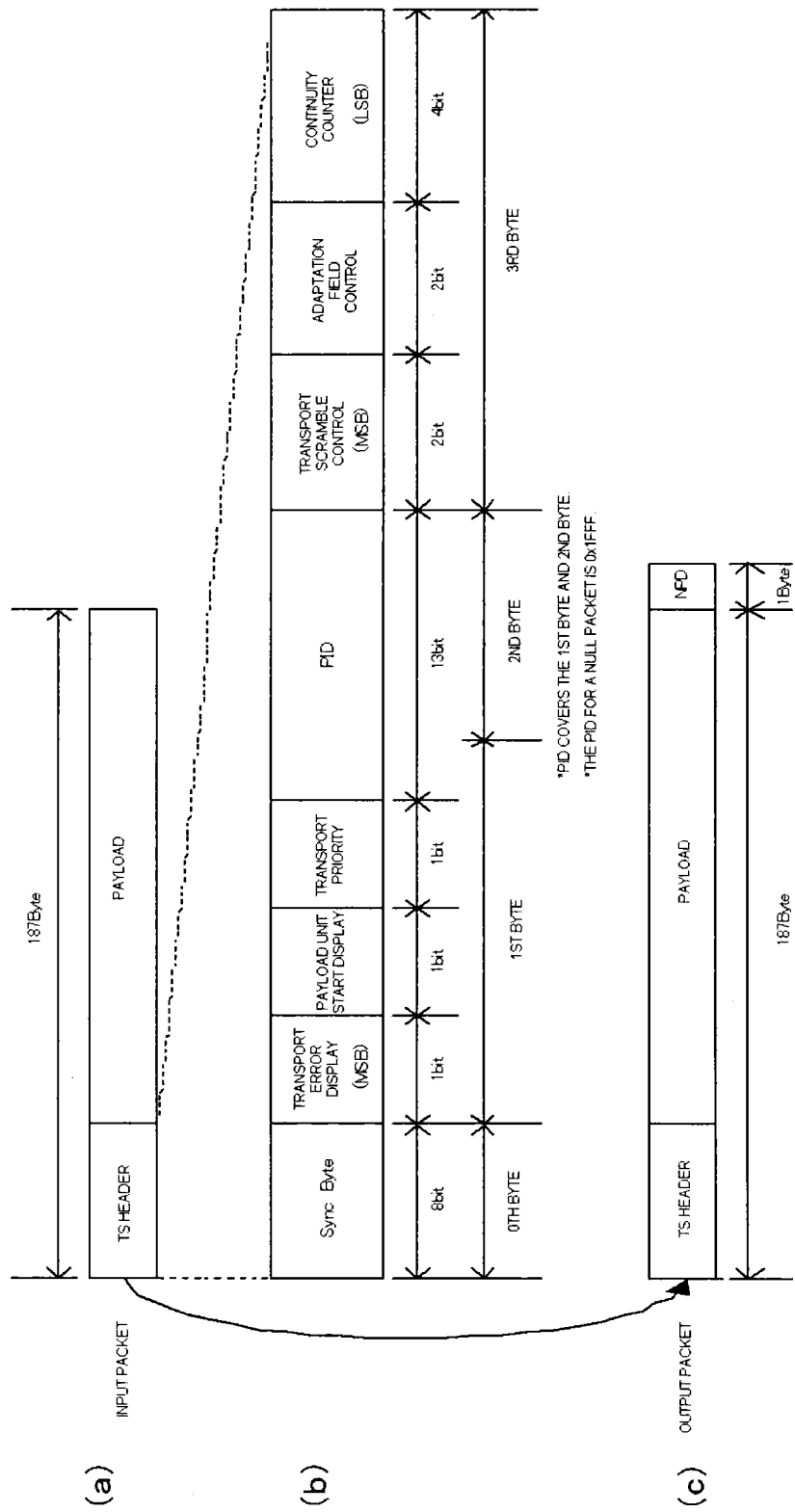
FIGS. 6A and 6B are drawings illustrating the configuration of a packet.
FIG. 6C is a drawing explaining NPD.

Conversely, when it is determined that a packet is not a null packet, the processor 242, as illustrated in FIG. 6C, attaches a 1-byte NPD (Null Packet Delete) that indicates the value of the counter 243 (=number of continuous null packets just previous to the packet=number of deleted null packets) to the end of the TS frame of the packet, and outputs the packet to the rate-varying circuit 205. After that, the processor 242 resets the counter value of the counter 243 to 0.

The rate-varying circuit 205 functions as a buffer and includes a FIFO (First In First Out) memory, and the rate-varying circuit 205 buffers a TS stream from which null packets have been deleted using the FIFO method, and in response to a request from the modulator 206, outputs stored packets.

The modulator 206 functions as a modulator/transmitter, and in response to a blockage-timing signal ST that is provided from the blockage-timing-estimation circuit 209, and at timing when transmission is possible (timing when the antenna beam in a direction toward the communication satellite 300 is not blocked by the rotor blades), sends a request to the rate-varying circuit 205 to output packets, and then reads and modulates the data of the buffered packets to be transmitted from the start sequentially.

The transmitter 207 functions as a modulator/transmitter that converts the modulated transmission signal into a high frequency and amplifies the signal to a high output, then supplies that transmission signal to the antenna 208.

The antenna 208 transmits the transmission signal from the transmitter 207 toward the communication satellite 300.

Figure 7:
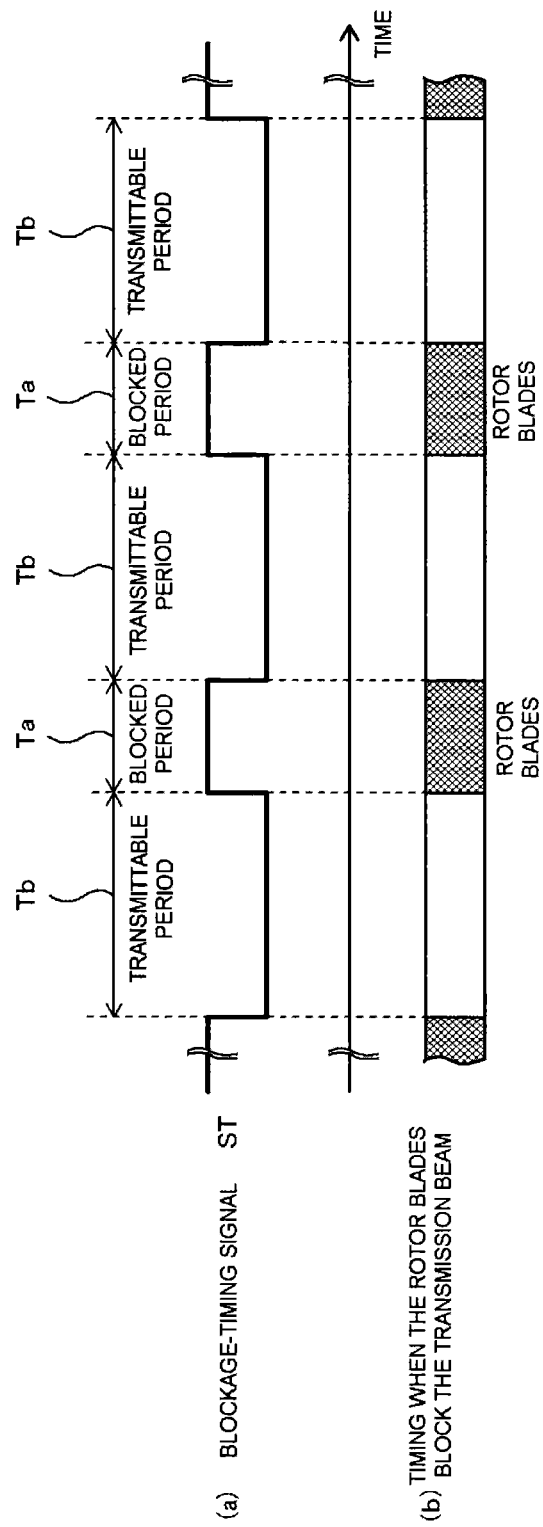
FIG. 7A is a drawing illustrating an example of a blockage-timing signal.
FIG. 7B is a drawing illustrating the timing at which the rotor blades block the communication path.

The blockage-timing-estimation circuit 209 functions as part of a blocked-time-rate estimator that, based on inertial navigation data and a rotor-blade-detection signal, estimates the blockage timing at which the rotor blades block the antenna beam in the direction toward the communication satellite 300 illustrated in FIG. 7B, and outputs a blockage-timing signal ST as illustrated in FIG. 7A.

Here, the inertial navigation data is such data that indicates the spatial state of the helicopter and includes attitude information about the helicopter (roll angle, pitch angle, yaw angle and nose direction) and position information (navigation altitude, latitude and longitude). Moreover, the rotor-blade-detection signal is a signal that is detected at a specified rotation position every time the rotor blades rotate around the axis of rotation, and for example, the rotor-blade-detection signal is a signal that is output when a detector (magnetic detector) that is provided at a specified angle on the craft body side (fixed side) detects a mark (mark such as a pin made using a magnetic material) that is provided on the rotor blades or axle (rotating side).

To explain this in more detail, the antenna 208 of the helicopter-mounted communication apparatus 200 is located on the craft body portion of the helicopter underneath the rotor blades. Depending on the orientation or geographical position of the helicopter, the direction of the communication satellite 300 as seen from the antenna 208 changes, and as a result, the timing at which a beam transmitted from the antenna 208 is blocked (instantaneously interrupted) by the rotor blades also changes. The blockage-timing-estimation circuit 209 stores position information about the communication satellite 300 in advance, and from the supplied inertial navigation data and the stored position information about the communication satellite 300, calculates the direction of the transmission beam that is transmitted by the helicopter antenna 208. Next, from the calculated transmission beam direction and from the rotor-blade-detection signal, the blockage-timing-estimation circuit 209 determines the time at which the rotor blades pass a specified angle position (transmission beam position). The blockage-timing-estimation circuit 209 counts the detection signal and calculates the average speed of the rotor blades, then based on that calculated rotor-blade speed, estimates change over time of the angle position of the rotor blades. From the change over time of the angle position of the rotor blades and from the beam direction, the blockage-timing-estimation circuit 209 estimates the blocked period (instantaneously interrupted period: period when transmission is not possible) Ta when the beam is blocked (instantaneously interrupted) by the rotor blades, and estimates the period until the beam is blocked by the rotor blades the next time (transmittable period Tb), then generates a blockage-timing signal ST as illustrated in FIG. 7A.

The blocked-time-rate-estimation circuit 210 functions as part of a blocked-time-rate estimator that determines the blocked-time rate that indicates the percentage of time that the communication path from the antenna 208 toward the communication satellite 300 is blocked by the rotor blades during one rotation of the rotor blades. The blocked-time-rate-estimation circuit 210 calculates the blocked-time rate TR from the ratio of the blocked time Ta and the transmittable time Tb determined from the blockage-timing signal ST (TR=Ta/(Ta+Tb)*100). For example, when the ratio of the blocked time Ta to the transmittable time Tb is 1:4, the blocked-time rate is calculated to be 20%.

When the width of the rotor blades is assumed to be a constant value, the blocked-time rate TR of the blockage by the rotor blades during one rotation of the rotor blades becomes smaller the further the transmission beam that is transmitted from the antenna 208 toward the communication satellite 300 is separated from the base of the rotor blades.

The video-encoding-parameter-selection circuit 211 functions as a video-encoding-parameter selector that, based on the blocked-time rate TR that is determined by the blocked-time-rate-estimation circuit 210, sets encoding parameters for the video-encoding circuit 202.

Theoretically, it is possible to calculate the transmission bit rate at which transmission is possible from the blocked-time rate TR and the communication bandwidth. It is possible to determine the maximum information speed by subtracting a redundant portion due to error-correcting encoding, and/or an attached signal portion such as a frame-synchronization word and a preamble from this transmission bit rate. The video-encoding-parameter-selection circuit 211 sets video-encoding parameters such as the video-encoding rate or image-frame rate so that the information speed after the null packets have been deleted (transmission speed of transmission data that is output from the transmitter 207) matches this maximum information speed.

As a result, as the blocked-time rate TR becomes higher, by reducing the amount of information in video packets that are output from the video-encoding circuit 202 and increasing the amount of information in null packets instead, the TS rate of packets that are output from the data-selection circuit 203 is kept substantially constant. On the other hand, it is also possible to vary the information speed in response to the blocked-time rate TR by the null-packet-deletion circuit 204 deleting null packets, and the rate-varying circuit 205 buffering transmission data using the FIFO method.

The nose direction or attitude of the helicopter and the rotational speed of the rotor changes every moment. Therefore, the blocked-time rate TR changes every moment as illustrated in FIG. 3B. Consequently, continuously changing the video-encoding parameters to correspond to the change in the blocked-time rate TR puts a heavy burden on processing. Therefore, as illustrated in FIG. 3A, in this embodiment several kinds of video-encoding parameters are set in advance, and the video-encoding-parameter-selection circuit 211 performs a threshold judgment to the blocked-time rate TR and selects appropriate parameter, and then sets those parameters for the video encoding circuit 202. However, it is preferred that hysteresis is set for a threshold value and that the threshold value be set so that there is approximately a 2 to 5% difference between a threshold value that is used in a case that the blocked-time rate TR changes from a small value that is less than the threshold value to a large value that is more than the threshold value and a threshold value that is used in a case that the blocked-time rate TR changes from a large value that is more than the threshold value to a small value that is less than the threshold value, so that a video-encoding parameter does not frequently change.

Next, the structure of the terrestrial station communication apparatus 100 is explained with reference to FIG. 8.

The terrestrial station communication apparatus 100 includes: an antenna 101, a receiver 102, a demodulator 103, a null-packet-insertion circuit 104, a rate-fluctuation-compensation circuit 105, a data-separation circuit 106, and a video-decoding circuit 107.

The antenna 101 receives radio waves from the communication satellite 300 and outputs the radio waves to the receiver 102.

The receiver 102 functions as a receiver that performs low-noise amplification and low-frequency conversion of the signal that is received by the antenna 101.

The demodulator 103 functions as a demodulator that demodulates the signal received by the receiver 102.

The null-packet-insertion circuit 104 functions as a null-packet inserter that inserts null packets that are deleted by the null-packet-deletion circuit 204 of the helicopter-mounted communication apparatus 200.

More specifically, the null-packet-insertion circuit 104 references the NPD of the demodulated packets, and when a number is recorded there, the null-packet-insertion circuit 104 generates that number of null packets and inserts the null packets before or after those packets.

The rate-fluctuation-compensation circuit 105 functions as a rate-fluctuation compensator that buffers packets received after the insertion of null packets using the FIFO method, smoothes the rate fluctuation, and makes the TS rate constant.

The data-separation circuit 106 functions as a data separator that separates the packets that are output at a constant rate from the rate-fluctuation compensation circuit 105 into video packets, audio packets, index packets and null packets, and outputs the packets. The null packets are discarded.

The video-decoding circuit 107 functions as a video decoder that performs an expansion process on video packets that have been output from the data-separation circuit 106, and then reproduces and outputs video data.

Figure 9:
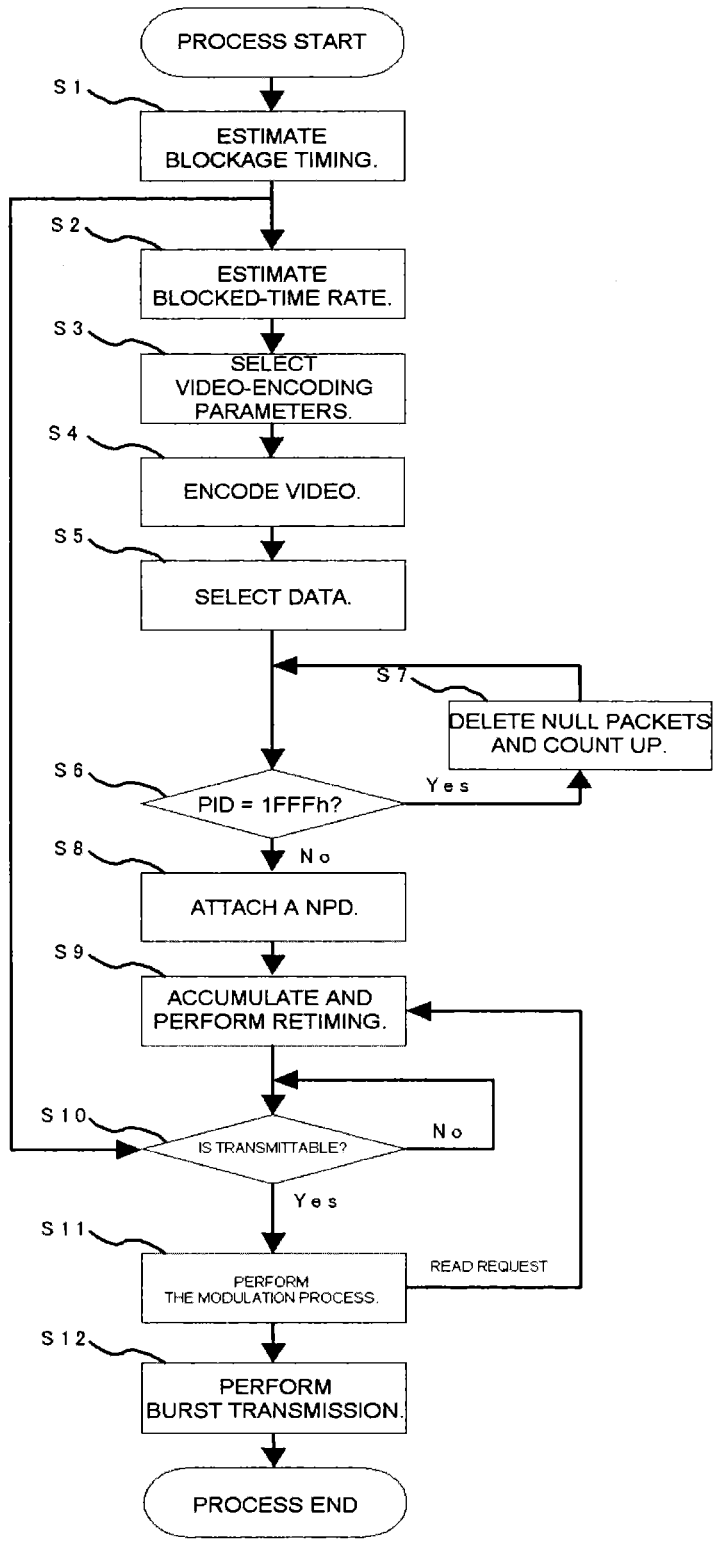
FIG. 9 is a flowchart for explaining the processing by the helicopter-mounted communication apparatus of an embodiment.
Figure 10:
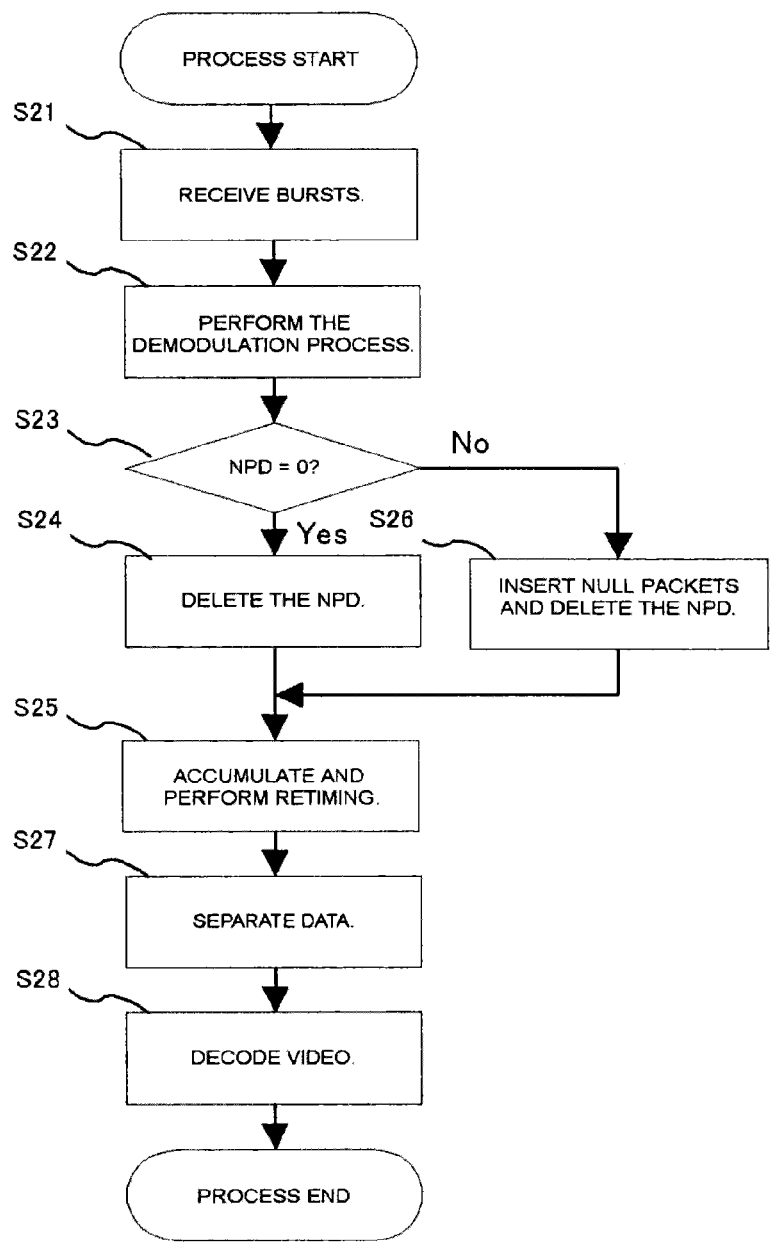
FIG. 10 is a flowchart for explaining the processing by the terrestrial station communication apparatus of an embodiment.

Next, the operation of the helicopter-mounted communication apparatus 200 and terrestrial station communication apparatus 100 having structure as described above is explained with reference to the process flow illustrated in FIG. 9 and FIG. 10.

First, the transmitting operation of the helicopter-mounted communication apparatus 200 is explained. Each of the components of the helicopter-mounted communication apparatus 200 operates simultaneously, however, in order to facilitate understanding, the operation is explained using the flowchart illustrated in FIG. 9.

As described above, inertial navigation data and a rotor-blade detection signal are supplied to the blockage-timing-estimation circuit 209.

From the inertial navigation data and rotor-blade detection signal, the blockage-timing-estimation circuit 209, as illustrated in FIG. 7B, determines the timing at which the rotor blades block the communication path between the antenna 208 and the communication satellite 300, and then calculates the time that the blockage continues, and generates and outputs a blockage-timing signal ST as illustrated in FIG. 7A (step S1). The period when the blockage-timing signal ST is high level is blocked period Ta, during which communication is not possible, and the period when the blockage-timing signal ST is low level is the transmittable period Tb, during which communication is possible.

The blocked-time-rate estimation circuit 210 estimates the blocked-time rate TR from the supplied blockage-timing signal ST. More specifically, the blocked-time-rate estimation circuit 210 determines the blocked-time rate TR from the blockage-timing signal ST based on the following equation (step S2).

$$TR=Ta/(Ta+Tb)*100$$

Based on the blocked-time rate TR supplied from the blocked-time-rate-estimation circuit 210, the video-encoding-parameter-selection circuit 211 determines the video-encoding parameters, such as the video-encoding rate and image-frame rate, by referencing the video-encoding-parameter-setting table 211T illustrated in FIG. 3A, then sets those parameters for the video-encoding circuit 202 (step S3). When doing this, the parameters are switched with having the parameters hysteresis so that the blocked-time rate TR does not fluctuate and so that the encoding parameters do not frequently change.

The video-encoding circuit 202 encodes video data that is supplied from the imaging apparatus using the set parameters (step S4).

Conversely, the audio-encoding circuit 201 encodes the obtained audio at a predetermined encoding rate, generates audio packets and supplies the audio packets to the data-selection circuit 203.

The data-selection circuit 203 sequentially selects the supplied video packets, audio packets and index packets. Furthermore, in response to the blocked-time rate TR that is supplied from the blocked-time-rate-estimation circuit 210 and the stored selection-control table 203T, the data-selection circuit 203 selects and outputs null packets at a specified percentage relative to the number of selected video packets (step S5).

As described above, as the blocked-time rate TR increases, the number of video packets gradually decreases, assuming that the input video data is constant. The data-selection circuit 203 compensates for the decrease in video packets by selecting and outputting null packets at a percentage specified in the selection-control table 203T, and keeps the TS rate of the output packets substantially constant regardless of fluctuation in the blocked-time rate TR (step S6).

The null-packet-deletion circuit 204 checks the value of the PID that is included in the TS header that is attached to the start of a packet that is supplied from the data selection circuit 203, and when the value is 1FFFhex, determines that the packets is a null packet (step S6: YES), and deletes the null packet, and counts the number of continuous null packets (step S7).

On the other hand, in step S6, when the value of the PID is something other than 1FFFhex, that is, when the packet to be processed is something other than a null packet, the null-packet-detection circuit attaches an NPD, which indicates the number of deleted null packets, to the end of the packet (step S8).

The rate-varying circuit 205 accumulates the TS stream that is supplied from the null-packet-deletion circuit 204 using the FIFO method (step S9).

The modulator 206, according to the signal level of the blockage-timing signal ST, determines whether the period is a transmittable period Tb (step S10), and when the present period is a transmission-not-possible period Ta (step S10: NO), processing waits, and when the present period is a transmittable period Tb (step S10: YES), the modulator reads the data stored in the rate-varying circuit 205 and performs modulation, then supplies the result to the transmitter 207 (step S11).

The transmitter 207 converts the modulated transmission signal into a high frequency and amplifies the signal, then performs burst transmission from the antenna 208 between the rotor blades toward the communication satellite 300 (step S12).

The signal that is transmitted in this way is repeated by the communication satellite 300 and transmitted toward the terrestrial communication apparatus 100.

Next, the operation of the terrestrial communication apparatus 100 receiving a signal that has been transmitted in this way is explained. Each of the components of the terrestrial communication apparatus 100 operates simultaneously, however, in order to facilitate understanding, operation is explained using the flowchart illustrated in FIG. 10.

The receiver 102, via the antenna 101 that is directed toward the communication satellite 300, receives in bursts the signal that is repeated by the communication satellite 300, and outputs the received signal to the demodulator 103 (step S21).

The demodulator 103 performs demodulation of the supplied signal, and supplies the demodulated signal to the null-packet-insertion circuit 104 (step S22).

The null-packet-insertion circuit 104 checks the NPD that is attached at the end of the received packets (step S23), and when the NPD is 0 (step S23: YES), deletes the NPD (step S24), and outputs the packets to the rate-fluctuation-compensation circuit 105.

Conversely, when the NPD is something other than 0 (step S23: NO), the null-packet-insertion circuit 104 inserts null packets for the NPD value, and then deletes the NPD from the received packets (step S26) and outputs the result to the rate-fluctuation-compensation circuit 105.

The rate-fluctuation-compensation circuit 105 accumulates the packets that are supplied from the null-packet-insertion circuit 104 using the FIFO method (step S25). Moreover, the rate-fluctuation-compensation circuit 105 also smoothes the packet rate, and performs retiming for the accumulated packets and outputs the packets to the data-separation circuit 106 (step S25).

The data-separation circuit 106 separates data into video packets, audio packets and index packets, and discards null packets (step S27).

The video-decoding circuit 107 decodes video packets that are supplied from the data-separation circuit 106, and outputs video data (step S28).

Operation such as described above is explained using a detailed example.

Here, a situation is assumed in which the blocked-time rate TR is a very low value that is 5%.

The video-encoding-parameter-selection circuit 211, based on the blocked-time rate TR, references the video-encoding-parameter-setting table 211T illustrated in FIG. 3A, and determines video-encoding parameters so that both the video-encoding rate and image-frame rate are high speed, and sets the parameters for the video-encoding circuit 202 (step S3).

Figure 11:
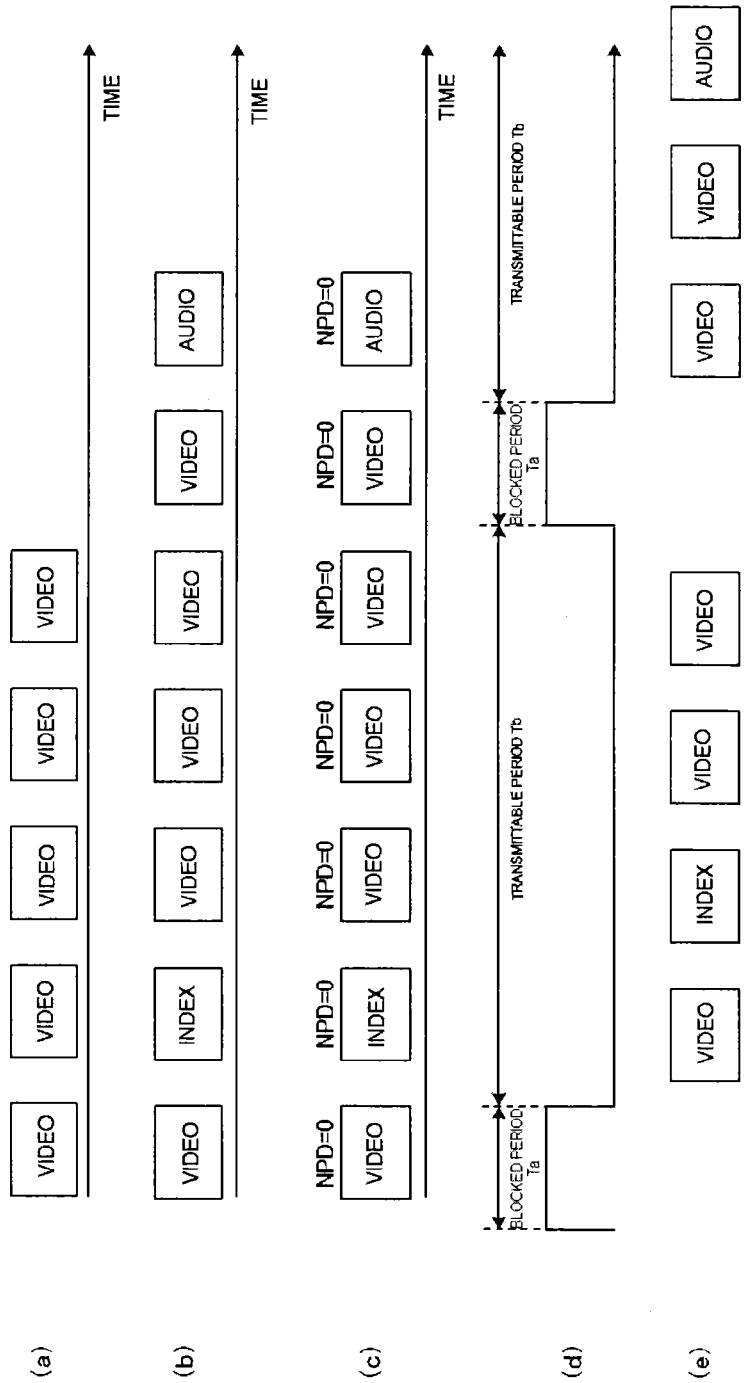
FIG. 11A to FIG. 11E are drawings for explaining the operation of the helicopter satellite communication system in the case in which the blocked-time rate is small.

The video-encoding circuit 202 encodes video data that is supplied from the imaging apparatus using the set parameters. Here, it is presumed that five video packets as illustrated in FIG. 11A are generated during a predetermined period.

The data-selection circuit 203 selects and outputs video packets, audio packets, index packets and null packets. However, the blocked-time rate is 5%, and according to the selection-control table 203T, the selectivity of null packets is 0, so null packets are not selected. It is presumed that a packet stream such as illustrated in FIG. 11B is generated in this way.

There are no null packets included in the supplied packet stream, so the null-packet-deletion circuit 204 attaches an NPD=0 to the end of all packets as illustrated in FIG. 11C, and outputs the packet stream.

The rate-varying circuit 205 accumulates the supplied TS stream using the FIFO method (step S9).

The modulator 206, as schematically illustrated in FIGS. 11D and 11E, determines whether the period is a transmittable period Tb according to the signal level of the blockage-timing signal ST, and when the current period is a transmittable period Tb, reads and modulates the data accumulated by the rate-varying circuit 205, and supplies that data to the transmitter 207 (step S11).

The transmitter 207 converts the modulated transmission signal into a high frequency and amplifies the signal, then performs burst transmission from the antenna 208 between the rotor blades toward the communication satellite 300 (step S12).

The receiver 102 of the terrestrial station communication apparatus 100 receives in bursts the signal repeated by the communication apparatus 300, and outputs the signal to the demodulator 103 (step S21).

The demodulator 103 performs demodulation of the received signal that is supplied, and demodulates the signal illustrated in FIG. 11E, then supplies the signal to the null-packet-insertion circuit 104 (step S22).

The null-packet-insertion circuit 104 checks the NPD that is attached to the end of the received packets (step S23), and because the NPD is 0 (step S23: YES), deletes the NPD (step S24) and outputs the packets to the rate-fluctuation-compensation circuit 105.

The rate-fluctuation-compensation circuit 105 accumulates the packets supplied from the null-packet-insertion circuit 104 using the FIFO method (step S25). The rate-fluctuation-compensation circuit 105, in order to smooth the packet rate, performs retiming of the accumulated packets, and as illustrated in FIG. 11B, outputs packets to the data-separation circuit 106 (step S27).

The data-separation circuit 106 outputs video packets, audio packets and index packets (step S27).

The video-decoding circuit 107 decodes the video packets illustrated in FIG. 11A that are supplied from the data-separation circuit 106, and outputs video data (step S28).

Figure 12:
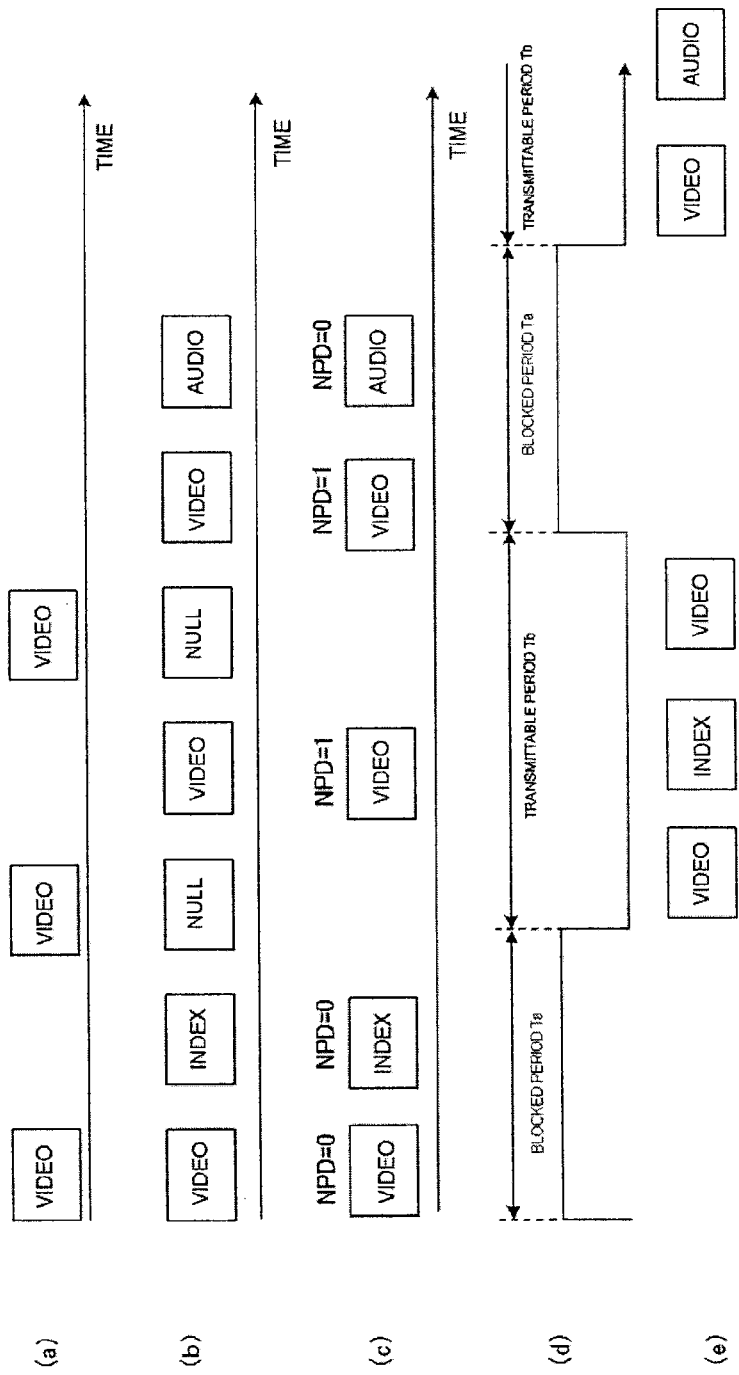
FIG. 12A to FIG. 12E are drawings for explaining the operation of the helicopter satellite communication system in the case in which the blocked-time rate is high.

Next, operation in a situation where the blocked-time rate TR is a high value that is 50% is explained with reference to FIG. 12. Except for the blocked-time rate TR, the conditions are the same as in the example explained with reference to FIG. 11.

The video-encoding-parameter-selection circuit 211, based on the blocked-time rate TR, references the video-encoding-parameter-setting table 211T illustrated in FIG. 3A, and determines video-encoding parameters such that both the video-encoding rate and image-frame rate is an intermediate speed, then sets the parameters for the video-encoding circuit 202 (step S3).

The video-encoding circuit 202 encodes video data that is supplied from the imaging apparatus using the set parameters. Here, it is presumed that three video packets such as illustrated in FIG. 12A are generated during a predetermined period. The video packets are reduced by two due to changes in the encoding parameters as the blocked-time rate TR fluctuates.

The data-selection circuit 203 selects and outputs video packets, audio packets, index packets and null packets. However, there are only three video packets, which is less than the specified number of five, and the blocked-time rate TR is 50%, so according to the selection-control table 203T, the selectivity of null packets is determined to be 40%, and an appropriate number of null packets is selected. In other words, here, two null packets are selected for the three video packets to compensate for the two lacking video packets. In this way, a packet stream such as illustrated in FIG. 12B is generated. The packet rate of this packet stream is substantially the same as the packet rate in the case illustrated in FIG. 11B when the blocked-time rate TR is small.

The null-packet-deletion circuit 204 deletes null packets that are in the supplied packet stream, and to packets that are not null packets, attaches at the end a NPD that indicates the number of continuous null packets just before, and outputs the packet stream illustrated in FIG. 12C.

The transmission rate of this packet stream is less than the transmission rate illustrated in FIG. 11C when the blocked-time rate TR is small, and even though the blocked-time rate TR is large, transmission is possible during the transmittable period Tb.

The rate-varying circuit 205 accumulates a supplied TS stream using the FIFO method (step S9).

As schematically illustrated in FIGS. 12D and 12E, the modulator 206, according to the signal level of the blockage-timing signal ST, determines whether the period is a transmittable period Tb, and when the current time is in a transmittable period Tb, the modulator 206 reads the data accumulated by the rate-varying circuit 205 and performs modulation, then supplies that data to the transmitter 207 (step S11).

The transmitter 207 converts the modulated transmission signal into a high frequency and amplifies the signal, then performs burst transmission from the antenna 208 toward the communication satellite 300 between the rotor blades (step S12).

The receiver 102 of the terrestrial station communication apparatus 100 receives in bursts the signal repeated by the communication satellite 300, and outputs that signal to the demodulator 103 (step S21).

The demodulator 103 performs demodulation of the received signal that is supplied, and demodulates the signal illustrated in FIG. 12E, then supplies that signal to the null-packet-insertion circuit 104 (step S22).

The null-packet-insertion circuit 104 checks the NPD that is attached to the end of the received packets (step S23), and inserts null packets to correspond to the value of the NPD, then deletes the NPD (step S24) and outputs the packets to the rate-fluctuation-compensation circuit 105.

The rate-fluctuation-compensation circuit 105 accumulates the packets that are supplied from the null-packet-insertion circuit 104 using the FIFO method (step S25). In order to smooth the packet rate, the rate-fluctuation-compensation circuit 105 performs retiming of the accumulated packets, and as illustrated in FIG. 12B, outputs the packets to the data-separation circuit 106 (step S27). The transmission rate at that time is the same as the transmission rate in the case illustrated in FIG. 11B when the blocked-time rate TR is small, and the fluctuation of the transmission rate due to fluctuation of the blocked-time rate TR is small.

The data-separation circuit 106 outputs video packets, audio packets and index packets (step S27).

The video-decoding circuit 107 decodes the video packets illustrated in FIG. 12A that are supplied from the data-separation circuit 106, and outputs the video data (step S28).

As is explained above, with this embodiment, when the blocked-time rate TR is small, both the video-encoding rate and image-frame rate are set to high speed, and it is possible to increase the video packets and transmit high-quality video while keeping the TS rate constant.

Conversely, as the blocked-time rate TR becomes higher, the video-encoding rate and the image-frame rate are set relatively low, and by decreasing the number of the video packets and increasing the number of the null packets, it is possible to keep the TS rate constant and reduce rate fluctuation, and to perform seamless video transmission.

As a result, by keeping the TS rate constant regardless of the blocked-time rate TR, and by the video-decoding circuit 107 expanding the video packets that are separated by the data-separation circuit 106, it is possible to transmit even higher quality video.

The embodiment described above is only an example, and various modifications and applications are possible.

Figure 8:
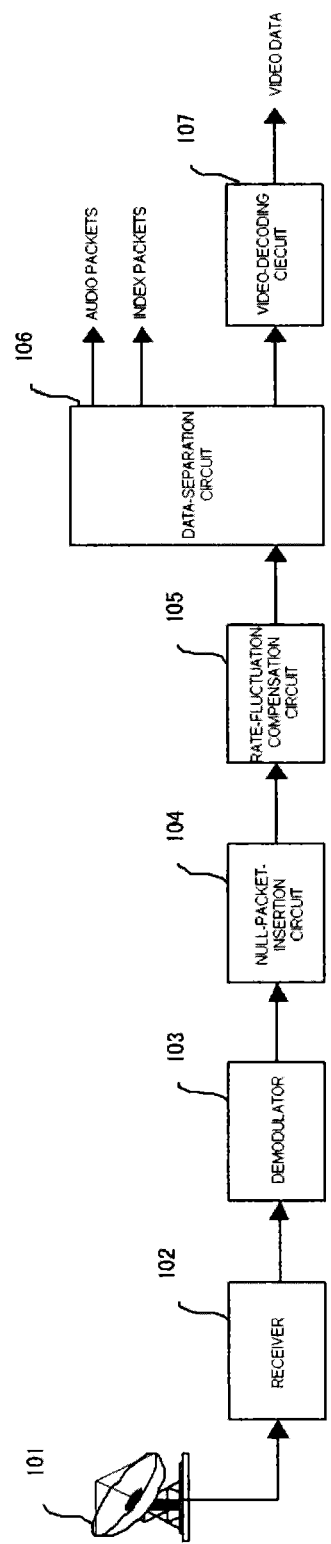
FIG. 8 is a block diagram illustrating the structure of a terrestrial station communication apparatus of an embodiment.

For example, the circuit structure of the helicopter-mounted communication apparatus 200 illustrated in FIG. 2 and the terrestrial station communication apparatus 100 illustrated in FIG. 8 can be appropriately changed. For example, all or part of the circuits having discrete structure can be performed by a DSP (Digital Signal Processor) and software.

Moreover, video-encoding rate and video-frame rate are given as examples of encoding parameters used by the video-encoding circuit 202, however, other encoding parameters can be adjusted.

The numerical values that are set in the video-encoding-parameter-setting table 211T and the selection-control table 203T can also be appropriately changed. Moreover, when the number of packets is less than the specified number, the data-selection circuit 203 can select null packets so that the number of output packets is constant without using the blocked-time rate TR, the selection-control table 203T or the like.

An example is given in which only the video packets are compressed in response to the blocked-time rate TR; however, similar processing can be performed for audio packets, and null packets can be added when the number of audio packets is less than a specified number. Alternatively, video packets can include audio data. In addition, any desired type of packets can be included.

In the embodiment described above, a highly precise value is used as the blocked-time rate, however, it is also possible to use, for example, the rotational speed of the rotor blades, or another index value that corresponds to the blocked-time rate TR as the blocked-time rate.

The helicopter satellite system 1, terrestrial station communication apparatus 100 and helicopter-mounted communication apparatus 200 of this embodiment can be performed using an exclusive system, or can be performed by using a normal computer system. For example, a program for executing the aforementioned operations may be stored on a computer-readable non-transitory recording medium, and the helicopter satellite communication system 1, terrestrial station communication apparatus 100 and helicopter-mounted communication apparatus 200 may be configured with a computer to which the program, distributed by a computer-readable recording medium, is installed. It is also possible to store the program on a disc apparatus of a server on a network such as the Internet, and to download that program to a computer, for example. The functions described above can also be performed by the OS and application software working together. In that case, the portion other than the OS can be stored and distributed on a medium and downloaded to a computer.

As the non-transitory recording medium on which the program above is stored, it is possible to use a non-transitory recording medium that can be read by a computer such as a USB memory, flexible disc, CD, DVD, Blu-ray (registered trademark), MO, SD card, memory stick (registered trademark), as well as, a magnetic disc, optical disc, magneto-optical disc, semiconductor memory, magnetic tape and the like.

The present disclosure can be embodied in various ways and can undergo various modifications without departing from the broad spirit and range of the disclosure. Moreover, the embodiment described above is for explaining the present disclosure, and does not limit the range of the disclosure. In other words, the range of the present disclosure is as set forth in the Claims and not the embodiment. Various changes and modifications that are within the range disclosed in the claims or that are within a range that is equivalent to the claims of the disclosure are also included within the range of the present disclosure.

This specification claims priority over Japanese Patent Application No. 2012-077558, including the description, claims, drawings and abstract, as filed on Mar. 29, 2012. This original patent application is included in its entirety in this specification by reference.

REFERENCE SIGNS LIST

1 Helicopter satellite communication system
100 Terrestrial station communication apparatus
101 Antenna
102 Receiver
103 Demodulator
104 Null-packet-insertion circuit
105 Rate-fluctuation-compensation circuit
106 Data-separation circuit
107 Video-decoding circuit
200 Helicopter-mounted communication apparatus
201 Audio-encoding circuit
202 Video-encoding circuit
203 Data-selection circuit
203T Selection-control table
204 Null-packet-deletion circuit
205 Rate-varying circuit
206 Modulator
207 Transmitter
208 Antenna
209 Blockage-timing-estimation circuit
210 Blocked-time-rate-estimation circuit
211 Video-encoding-parameter-selection circuit
211T Video-encoding-parameter-setting table
220 Imaging apparatus
241 Buffer
242 Processor
243 Counter
300 Communication satellite
400, 500 Transmission line

The invention claimed is:

1. A helicopter satellite communication system that performs communication between a helicopter-mounted communication apparatus and a terrestrial station communication apparatus via a communication satellite, wherein
the helicopter-mounted communication apparatus includes:
a blocked-time-rate estimator that estimates a blocked-time rate, which is the percentage of the time that a transmission beam that is transmitted from the helicopter-mounted communication apparatus toward the communication satellite is blocked by rotor blades;
a video-encoding-parameter selector that selects video-encoding parameters based on the blocked-time rate that is estimated by the blocked-time-rate estimator;
a video encoder that encodes video data according to the video-encoding parameters selected by the video-encoding-parameter selector, and outputs video packets;
a data selector that, when the number of video packets that are output from the video encoder is less than a specified number, inserts null packets to keep the transmission packet rate substantially constant;
a null-packet deleter that deletes null packets in a packet stream that is output from the data selector and attaches information indicating the number of the deleted null packets to another packet;
a buffer that buffers packets after deleting of null packets by the null-packet deleter; and
a modulator/transmitter that modulates packets that are stored in the buffer and transmits those packets toward the communication satellite during a transmittable period; and
the terrestrial station communication apparatus includes:
a receiver that receives a signal that is transmitted from the helicopter-mounted communication apparatus via the communication satellite;
a demodulator that demodulates the signal received by the receiver and generates a packet stream;
a null-packet inserter that, based on attached information that is included in the packet stream that is reproduced by the demodulator, inserts null packets into the packet stream and deletes the attached information;
a rate-fluctuation compensator that keeps the packet rate substantially constant by buffering a packet stream after inserting of null packets by the null-packet inserter;

a data separator that separates video packets from the packet stream that is output from the rate-fluctuation compensator; and a video decoder that decodes the video packets that are separated out by the data separator.

2. The helicopter satellite communication system according to claim 1, wherein the video-encoding-parameter selector selects video-encoding parameters so that the compression rate increases as the blocked-time rate increases;

the video encoder, according to the video-encoding parameters selected by video-encoding-parameter selector, encodes video data at a higher compression rate as the blocked-time rate increases; and the data selector increases the percentage for selecting null packets as the blocked-time rate increases.

3. The helicopter satellite communication system according to claim 1, wherein the null-packet deleter deletes null packets, and attaches information that indicates the number of the deleted null packets to the packet before or after the deleted null packets.

4. A helicopter-mounted communication apparatus for a helicopter satellite communication system that performs communication between a helicopter-mounted communication apparatus and a terrestrial station communication apparatus via a communication satellite, comprising:

a blocked-time-rate estimator that estimates a blocked-time rate, which is the percentage of the time that a transmission beam that is transmitted from the helicopter-mounted communication apparatus toward the communication satellite is blocked by rotor blades;

a video-encoding-parameter selector that selects video-encoding parameters based on the blocked-time rate that is estimated by the blocked-time-rate estimator;

a video encoder that encodes video data according to the video-encoding parameters selected by the video-encoding-parameter selector, and outputs video packets;

a data selector that, when the number of video packets that are output from the video encoder is less than a specified number, inserts null packets to keep the transmission packet rate substantially constant;

a null-packet deleter that deletes null packets in a packet stream that is output from the data selector and attaches information indicating the number of the deleted null packets to another packet;

a buffer that buffers packets after deleting of null packets by the null-packet deleter; and a modulator/transmitter that modulates packets that are stored in the buffer and transmits those packets toward the communication satellite during a transmittable period.

5. A terrestrial station communication apparatus for a helicopter satellite communication system that performs communication between a helicopter-mounted communication apparatus and a terrestrial station communication apparatus via a communication satellite, comprising:

a receiver that receives a signal that is transmitted from the helicopter-mounted communication apparatus via the communication satellite;

a demodulator that demodulates the signal received by the receiver and generates a packet stream;

a null-packet inserter that, based on attached information that is included in the packet stream that is reproduced by the demodulator and that indicates the number of deleted null packets, inserts null packets into the packet stream and deletes the attached information;

a rate-fluctuation compensator that keeps the packet rate substantially constant by buffering a packet stream after inserting of null packet by the null-packet inserter;

a data separator that separates video packets from the packet stream that is output from the rate-fluctuation compensator; and a video decoder that decodes the video packets that are separated out by the data separator.

6. A communication method for a helicopter to perform communication via a communication path that is blocked by rotor blades, that:

estimates the percentage of time that the communication path is blocked by the rotor blades;

encodes and outputs transmission packets at a compression rate based on the estimated percentage;

inserts null packets to keep the transmission packet rate substantially constant by inserting null packets when the number of transmission packets is less than a specified number;

deletes null packets and attaches information indicating the number of the deleted null packets to another transmission packet; and buffers packets after deleting of null packets, and transmits the buffered packets during a transmittable period.

7. A communication method that receives a signal that is transmitted via a communication path that is blocked by rotor blades, that:

receives a signal;

demodulates the received signal and generates a received packet stream;

inserts null packets into the packet stream based on attached information that is included in the generated packet stream and that indicates the number of deleted null packets;

deletes the attached information;

adjusts the packet rate by buffering the packet stream after inserting of the null packets;

separates specified packets from the packet stream; and decodes the separated packets.

8. A non-transitory computer-readable recording medium storing a computer program that causes a computer having a communication function to execute:

a process that estimates the percentage of time that a communication path is blocked by rotor blades;

a process that encodes and outputs transmission packets at a compression rate based on the estimated percentage;

a process that inserts null packets to keep the transmission packet rate substantially constant when the number of transmission packets is less than a specified number;

a process that deletes null packets and attaches information indicating the number of the deleted null packets to another transmission packet; and a process that, after buffering packets upon deletion of null packets, transmits the packets during a transmittable period.

9. A non-transitory computer-readable recording medium storing a computer program that causes a computer having a communication function to execute:

a process that receives a signal that is transmitted via a communication path that is blocked by rotor blades;

a process that demodulates the signal received and generates a received packet stream;

a process that, based on attached information that is included in the generated packet stream and that indicates the number of deleted null packets, inserts null packets into the packet stream;

a process that deletes the attached information;

a process that adjusts the packet rate by buffering a packet stream after inserting of the null packets;
a process that separates specified packets from the packet stream; and
a process that decodes the packets that are separated out.

* * * * *